United States Patent Office 3,809,770
Patented May 7, 1974

3,809,770
METHOD FOR PRODUCING ENHANCED SOLUBLE FOODSTUFFS
Michael D. Jolly, Highland Mills, N.Y., and George A. Jasovsky, Bayonne, Rudolf A. Vitti, Dumont, Gaetano J. De Ceglie, Palisades Park, Anthony T. Nacci, Bergenfield, and Harold Schechter, Hewitt, N.J., assignors to General Foods Corporation, White Plains, N.Y.
No Drawing. Filed May 12, 1972, Ser. No. 252,772
Int. Cl. A23f 1/08
U.S. Cl. 426—362
4 Claims

ABSTRACT OF THE DISCLOSURE

Soluble foodstuffs, such as soluble coffee, are enhanced by incorporating volatile enhancers into a liquid glyceride carrier, such as an oil, and then blending the enhanced liquid glyceride with a liquid comestible which is maintained at a sufficiently low temperature to congeal the enhanced liquid glyceride. Preferably the liquid comestible is in the form of a slush. The liquid, containing particles of congealed glyceride uniformly distributed throughout, is then dried, preferably by freeze drying.

BACKGROUND OF THE INVENTION

It has long been a problem to produce dry, reconstitutable food materials which will exhibit good aroma and flavor upon being reconstituted with water. Normally a large quantity of the volatile compounds which contribute to the aroma and flavor impact that is preferred by the consumers, is lost during the drying operation. Freeze drying has been employed in an attempt to preserve these volatile compounds, but this has not, by itself, proven to be entirely successful.

Another problem which has arisen when attempting to add aromas to comestible liquids, such as coffee extract, prior to drying is that aromatic losses are also encountered during the blending process. U.S. Pat. No. 3,244,533 relates unsuccessful attempts to aromatize coffee by dispersing coffee oil and aromas in a liquid extract prior to drying, and seeks to overcome these problems by first homogenizing coffee oil with the extract and thereafter adding the aromas to the oil-extract dispersion.

SUMMARY OF THE INVENTION

A method for producing aromatized dry soluble food materials, especially powdered materials which are adapted to be reconstituted in water, has been developed. According to the method of this invention volatile aromatic materials, either natural or synthetic, are combined with a liquid edible glyceride carrier, such as triacetin, an oil or a low melting point fat. This aromatized glyceride is then added to and blended with a chilled liquid extract which is undergoing continuous agitation. The liquid extract is at a temperature sufficiently low to congeal the glyceride carrier and the agitation is sufficient to distribute particles of the congealed, aromatized glyceride throughout the extract. Preferably the liquid extract is in the form of a slush, the slush being a mixture of ice crystals and concentrated extract. It is also desirable to completely freeze the extract immediately after the glyceride has been added so that the relatively uniform dispersion of glyceride particles will be maintained. The frozen aromatized extract may then be dried such as by vacuum freeze drying.

DESCRIPTION OF THE INVENTION

Soluble food powders are enhanced according to this invention in such a manner that a desirable aroma is released when the powder is dissolved in a liquid, such as hot water.

According to this invention natural or synthetic volatile materials are combined with a liquid glyceride, preferably an oil, carrier, blended with a chilled liquid comestible and then dried. This invention is particularly useful for enhancing such reconstitutable food powders as soluble coffee, instant dry soup mixes, etc. A preferred method also includes the step of slushing the extract prior to adding the enhanced liquid glyceride.

Typical of the natural material particularly useful for enhancing soluble coffee are aromas obtained from roaster and grinder gases and condensates obtained from the steam-distilled volatile aromas described in U.S. Pat. Nos. 2,562,206 to Nutting, 3,132,947 to Mahlmann, 1,244,521 to Clinton et al., 3,421,901 to Mahlmann et al., 3,532,507 to Cascione, and 3,615,665 (CVA) to White et al., and the vacuum-distilled volatile aromas described in U.S. Pat. Nos. 2,680,687 to Lemonnier and 3,035,922 to Mook et al. Typical synthetic enhancers for soluble coffee are the mercaptans, diacetyls and other, such as described in U.S. Pat. No. 1,696,419. Naturally these enhancing materials may be used either alone or in combination.

Suitable glyceride carriers are triacetin, the bland-tasting vegetable fats such as cottonseed oil and coconut oil and the like. Alternatively fats which are naturally present in the food product (e.g. coffee oil) may be used as the glyceride carrier. The glyceride carrier should be chosen such that it does not detract from the aroma and taste of the end product, has a relatively low melting point, does not affect the solubility of the dry product, and has storage stability at least equal to the dry food powder. The melting point of the glyceride is chosen so that the glyceride will be liquid at those temperatures at which the enhanced, reconstitutable powder is dissolved.

The glyceride and volatile enhancers may be combined by gently mixing the glyceride, in a liquid state, with the enhancers. Liquid glycerides such as oils are preferred for the carriers, since this mixing step may take place at room temperature or below. Low mixing temperatures are desirable in order to preserve the volatile components. In lieu of mixing, the volatile enhancers may be atomized on the surface of the glyceride carrier.

The enhanced liquid glyceride is slowly added to a chilled extract which is under continuous gentle agitation. The chilled extract is, prior to the addition of the glyceride, maintained at a temperature which is below the congealing point of the glyceride but above the point at which the extract becomes a solid. Agitation of the extract during addition of the glyceride is necessary both to form discrete particles of the congealed glyceride and to distribute the particles throughout the extract. However, the agitation should not be so vigorous as to either produce foaming in the extract or to cause melting of the congealed particles.

It will be preferred, especially in the case of dilute extracts, to chill the extract to a slush condition prior to adding the enhanced glyceride. The ice crystals present in the slush help to prevent the congealed glyceride particles from either raising to the surface of the extract or coalescing. Normally as little as 10% of ice by weight of the extract will be a sufficient degree of slushing to assure relatively even distribution of the glyceride in the extract. Slushing may be avoided, especially for concentrated, say above 35% solids by weight, extracts, if the extract is chilled reasonably close to its ice point, since this will tend to increase the viscosity of the extract.

Once the addition of the glyceride to the extract is complete and the glyceride particles are dispersed throughout the extract, the extract should be further cooled and solidified to a point where the glyceride particles will not be able to migrate. The extract then may be conventionally dried, such as by being completely frozen, granulated and freeze dried, as will be apparent to those skilled in the art.

This invention is further described but not limited by the following example:

EXAMPLE

Grinder gas is collected by grinding freshly roasted coffee in a Gump mill and condensing the evolved gas on a liquid nitrogen cold finger. This condensate is added to cottonseed oil at a ratio of 2 grams of condensate per ml. of oil. The mixture is then slowly added to a 27° F., 25% solids concentration coffee extract slush at a level of 5% oil by weight of coffee solids while the extract is being continuously mixed in a Hobart planetary mixer operating at about 35 r.p.m.'s. The resulting dispersion is then completely frozen at below −20° F., granulated and freeze dried.

The freeze dried coffee produced in accordance with the above example exhibits a pleasant aroma when dissolved in hot water rated as superior to the cup aroma obtained from conventional freeze dried coffees or from unaromatized control samples.

Having thus described the invention what is claimed is:

1. A method for enhancing soluble foodstuffs comprising the steps of:
   (a) combining a volatile enhancer and a liquid glyceride,
   (b) slowly adding the enhanced liquid glyceride to a continuously agitated slushed liquid extract which contains at least 10% by weight of ice and is maintained at a temperature which is sufficiently low to congeal the liquid glyceride, said agitation being sufficient to distribute particles of congealed glyceride throughout the slushed extract,
   (c) further cooling the enhanced glyceride-extract blend, immediately after glyceride particles are dispersed throughout the extract, in order to solidify the blend to a point where the glyceride particles will not be able to migrate,
   (d) completely freezing the solidified enhanced glyceride-extract blend,
   (e) granulating the completely frozen blend,
   (f) freeze drying the granulated enhanced glyceride-extract blend.

2. The method of claim 1 wherein the liquid extract is coffee extract and the volatile enhancer is a coffee aroma.

3. The method of claim 2 wherein the liquid glyceride is a vegetable oil.

4. The method of claim 3 wherein the coffee aroma is grinder gas.

References Cited
UNITED STATES PATENTS

| | | | |
|---|---|---|---|
| 3,373,042 | 3/1968 | Elerath et al. | 99—71 |
| 3,244,533 | 4/1966 | Clinton et al. | 99—71 |
| 2,947,634 | 8/1960 | Feldman et al. | 99—71 |

FRANK W. LUTTER, Primary Examiner

W. L. MENTLIK, Assistant Examiner

U.S. Cl. X.R.

426—385, 388

UNITED STATES PATENT OFFICE
CERTIFICATE OF CORRECTION

Patent No. 3,809,770          Dated  May 7, 1974

Inventor(s)   Michael D. Jolly et al.

It is certified that error appears in the above-identified patent and that said Letters Patent are hereby corrected as shown below:

In column 2, line 13, change "1,244,521" to

-- 3,244,521 --.

Signed and sealed this 8th day of October 1974.

(SEAL)
Attest:

McCOY M. GIBSON JR.
Attesting Officer

C. MARSHALL DANN
Commissioner of Patents